(12) United States Patent
Jiang

(10) Patent No.: US 8,270,433 B2
(45) Date of Patent: Sep. 18, 2012

(54) SENDING METHOD, RECEIVING AND PROCESSING METHOD AND APPARATUS FOR ADAPTING PAYLOAD BANDWIDTH FOR DATA TRANSMISSION

(75) Inventor: Zhangzhen Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 292 days.

(21) Appl. No.: 12/640,338

(22) Filed: Dec. 17, 2009

(65) Prior Publication Data

US 2010/0091794 A1 Apr. 15, 2010

Related U.S. Application Data

(63) Continuation of application No. PCT/CN2008/071372, filed on Jun. 19, 2008.

(30) Foreign Application Priority Data

Jun. 21, 2007 (CN) .......................... 2007 1 0112406

(51) Int. Cl.
*H04J 3/22* (2006.01)
(52) U.S. Cl. .................... 370/466; 370/474; 370/535
(58) Field of Classification Search .................. 370/466, 370/474, 535
See application file for complete search history.

(56) References Cited

U.S. PATENT DOCUMENTS

| | | | | |
|---|---|---|---|---|
| 7,639,687 | B1 * | 12/2009 | Tsai et al. | 370/392 |
| 7,782,805 | B1 * | 8/2010 | Belhadj et al. | 370/300 |
| 2004/0156390 | A1 * | 8/2004 | Prasad et al. | 370/466 |
| 2005/0047433 | A1 | 3/2005 | Rizer et al. | |
| 2007/0101241 | A1 * | 5/2007 | Hoyer | 714/776 |

FOREIGN PATENT DOCUMENTS

| | | |
|---|---|---|
| CN | 1748381 A | 3/2006 |
| CN | 1841976 A | 10/2006 |
| WO | WO 2008/154878 A1 | 12/2008 |

OTHER PUBLICATIONS

ITU-T Recommendataion G.7041/Y.1303, "Generic Framing Procedure (GFP)", Aug. 2005.*

(Continued)

*Primary Examiner* — Jason Mattis

(57) ABSTRACT

A sending method, a receiving and processing method and an apparatus for adapting a payload bandwidth for data transmission are provided. In the method, N coding blocks containing 64B are acquired, in which N is an integer greater than or equal to 2, and the acquired N coding blocks are converted into a (64*N+1)B coding block, so that a required linear rate is reduced after conversion, thereby reducing requirements for the payload bandwidth of a bearer layer, and satisfying the payload bandwidth required for transmitting 40 Gigabit Ethernet (40 GE) or 10 Gigabit Ethernet (10 GE) MAC frames in an optical transport network (OTN).

17 Claims, 11 Drawing Sheets

OTHER PUBLICATIONS

Teshima et al., "Bit-Error-Tolerant (512*N)B/(513*N+1)B Code for 40Gb/s and 100Gb/s Ethernet Transport", Jun. 17, 2008, INFOCOM Workshops 2008, IEEE.*

"IEEE Standard for Information technology—Telecommunications and information exchange between systems—Local and metropolitan area networks—Specific requirements—Part 3: Carrier Sense Multiple Access with Collision Detection (CSMA/CD) Access Method and Physical Layer Specifications—Amendment: Media Access Control (MAC) Parameters, Physical Layers, and Management Parameters for 10 Gb/s Operation," *IEEE Computer Society, The Institute of Electrical and Electronics Engineers, Inc.*, Standard 802.3ae, Aug. 30, 2002.

"Series G: Transmission Systems and Media, Digital Systems and Networks—Transport of IEEE 10G Base-R in Optical Transport Networks (OTN)," *International Telecommunication Union*, Supplement 43, Nov. 2006.

First Office Action in Chinese Application No. 200710112406.9, mailed Jun. 9, 2010.

Written Opinion in PCT Application No. PCT/CN2008/071372, mailed Oct. 9, 2008.

Search report of corresponding European Patent Application No. 08757781.3, mailed on Dec. 2, 2010, 5 pages total.

First office action of corresponding European Patent Application No. 08757781.3, mailed on Apr. 23, 2012, 6 pages total.

* cited by examiner

| Input Data | Syn | Block Payload | | | | | | | |
|---|---|---|---|---|---|---|---|---|---|
| Bit Position \ Data Block Format | 01 | 2 | | | | | | | 65 |
| D0D1D2D3/D4D5D6D7 | 01 | $D_0$ | $D_1$ | $D_2$ | $D_3$ | $D_4$ | $D_5$ | $D_6$ | $D_7$ |
| Control Block Formats | | Block Type Field | | | | | | | |
| C0C1C2C3/C4C5C6C7 | 10 | 0x1e | $C_0$ | $C_1$ | $C_2$ | $C_3$ | $C_4$ | $C_5$ | $C_6$ | $C_7$ |
| C0C1C2C3/O4D5D6D7 | 10 | 0x2d | $C_0$ | $C_1$ | $C_2$ | $C_3$ | $Q_4$ | $D_5$ | $D_6$ | $D_7$ |
| C0C1C2C3/S4D5D6D7 | 10 | 0x33 | $C_0$ | $C_1$ | $C_2$ | $C_3$ | | $D_5$ | $D_6$ | $D_7$ |
| O0D1D2D3/S4D5D6D7 | 10 | 0x66 | $D_1$ | $D_2$ | $D_3$ | $Q_0$ | | $D_5$ | $D_6$ | $D_7$ |
| O0D1D2D3/O4D5D6D7 | 10 | 0x55 | $D_1$ | $D_2$ | $D_3$ | $Q_0$ | $Q_4$ | $D_5$ | $D_6$ | $D_7$ |
| S0D1D2D3/D4D5D6D7 | 10 | 0x78 | $D_1$ | $D_2$ | $D_3$ | $D_4$ | $D_5$ | $D_6$ | $D_7$ |
| O0D1D2D3/C4C5C6C7 | 10 | 0x4b | $D_1$ | $D_2$ | $D_3$ | $Q_0$ | $C_4$ | $C_5$ | $C_6$ | $C_7$ |
| T0C1C2C3/C4C5C6C7 | 10 | 0x87 | | $C_1$ | $C_2$ | $C_3$ | $C_4$ | $C_5$ | $C_6$ | $C_7$ |
| D0T1C2C3/C4C5C6C7 | 10 | 0x99 | $D_0$ | | $C_2$ | $C_3$ | $C_4$ | $C_5$ | $C_6$ | $C_7$ |
| D0D1T2C3/C4C5C6C7 | 10 | 0xaa | $D_0$ | $D_1$ | | $C_3$ | $C_4$ | $C_5$ | $C_6$ | $C_7$ |
| D0D1D2T3/C4C5C6C7 | 10 | 0xb4 | $D_0$ | $D_1$ | $D_2$ | | $C_4$ | $C_5$ | $C_6$ | $C_7$ |
| D0D1D2D3/T4C5C6C7 | 10 | 0xcc | $D_0$ | $D_1$ | $D_2$ | $D_3$ | | $C_5$ | $C_6$ | $C_7$ |
| D0D1D2D3/D4T5C6C7 | 10 | 0xd2 | $D_0$ | $D_1$ | $D_2$ | $D_3$ | $D_4$ | | $C_6$ | $C_7$ |
| D0D1D2D3/D4D5T6C7 | 10 | 0xe1 | $D_0$ | $D_1$ | $D_2$ | $D_3$ | $D_4$ | $D_5$ | | $C_7$ |
| D0D1D2D3/D4D5D6T7 | 10 | 0xff | $D_0$ | $D_1$ | $D_2$ | $D_3$ | $D_4$ | $D_5$ | $D_6$ | |

FIG. 1 (Prior Art)

| Bit Position / Data Block Format | | | | | 0 | | | | | | | | 63 |
|---|---|---|---|---|---|---|---|---|---|---|---|---|---|
| D0D1D2D3/D4D5D6D7 | | | | | $D_0$ | $D_1$ | $D_2$ | $D_3$ | $D_4$ | $D_5$ | $D_6$ | $D_7$ | |
| Control Block Formats | | BP | LC | BT | BTX | | | | | | | | |
| C0C1C2C3/C4C5C6C7 | 0x1e | 11 | | | 0001 | . | $C_0$ | $C_1$ | $C_2$ | $C_3$ | . | $C_4$ $C_5$ $C_6$ $C_7$ | |
| C0C1C2C3/O4D5D6D7 | 0x2d | 11 | | | 0010 | . | $C_0$ | $C_1$ | $C_2$ | $C_3$ | . $Q_4$ | D5 | D6 D7 |
| C0C1C2C3/S4D5D6D7 | 0x33 | 11 | | | 0011 | . | $C_0$ | $C_1$ | $C_2$ | $C_3$ | . | D5 | D6 D7 |
| O0D1D2D3/S4D5D6D7 | 0x66 | 11 | | | 0100 | D1 | | D2 | | D3 | $Q_0$ . | D5 | D6 D7 |
| O0D1D2D3/O4D5D6D7 | 0x55 | 11 | | | 0101 | D1 | | D2 | | D3 | $Q_0$ $Q_4$ | D5 | D6 D7 |
| S0D1D2D3/D4D5D6D7 | 0x78 | 10 | | | | D1 | | D2 | | D3 | D4 | D5 | D6 D7 |
| O0D1D2D3/C4C5C6C7 | 0x4b | 11 | | | 0110 | . | D1 | | D2 | | D3 | . $Q_0$ | $C_4$ $C_5$ $C_6$ $C_7$ |
| T0C1C2C3/C4C5C6C7 | 0x87 | 11 | | | 0111 | | | . | | $C_1$ | $C_2$ $C_3$ | $C_4$ $C_5$ | $C_6$ $C_7$ |
| D0T1C2C3/C4C5C6C7 | 0x99 | 11 | | | 1000 | . | D0 | | . | | $C_2$ $C_3$ | $C_4$ $C_5$ | $C_6$ $C_7$ |
| D0D1T2C3/C4C5C6C7 | 0xaa | 11 | | | 1001 | . | D0 | | D1 | | . $C_3$ | $C_4$ $C_5$ | $C_6$ $C_7$ |
| D0D1D2T3/C4C5C6C7 | 0xb4 | 11 | | | 1010 | . | D0 | | D1 | | D2 | . $C_4$ $C_5$ | $C_6$ $C_7$ |
| D0D1D2D3/T4C5C6C7 | 0xcc | 11 | | | 1011 | . | D0 | | D1 | | D2 | D3 | . $C_5$ $C_6$ $C_7$ |
| D0D1D2D3/D4T5C6C7 | 0xd2 | 11 | | | 1100 | . | D0 | | D1 | | D2 | D3 | D4 $C_6$ $C_7$ |
| D0D1D2D3/D4D5T6C7 | 0xe1 | 11 | | | 1101 | D0 | | D1 | | D2 | D3 | D4 D5 | $C_7$ |
| D0D1D2D3/D4D5D6T7 | 0xff | 01 | | | | $D_0$ | | D1 | | D2 | D3 | D4 D5 | D6 |
| | | 00 | | | | Resv | | | | | | | |
| | | 11 | | | 0000 | Resv | | | | | | | |
| | | 11 | | | 1110 | Resv | | | | | | | |
| | | 11 | | | 1111 | Resv | | | | | | | |

FIG. 5

| Data Block Format \ Bit Position | | 0 | | | | | | | 63 |
|---|---|---|---|---|---|---|---|---|---|
| D0D1D2D3/D4D5D6D7 | | $D_0$ | $D_1$ | $D_2$ | $D_3$ | $D_4$ | $D_5$ | $D_6$ | $D_7$ |
| Control Block Formats | | BP | LC | BT | BTX | | | | |
| C0C1C2C3/C4C5C6C7 | 0x1e | 11 | 0001 | - | $C_0$ $C_1$ $C_2$ $C_3$ | - | $C_4$ | $C_5$ $C_6$ | $C_7$ |
| C0C1C2C3/O4D5D6D7 | 0x2d | 11 | 0010 | - | $C_0$ $C_1$ $C_2$ $C_3$ | - $Q_4$ | D5 | D6 | D7 |
| C0C1C2C3/S4D5D6D7 | 0x33 | 11 | 0011 | - | $C_0$ $C_1$ $C_2$ $C_3$ | - | D5 | D6 | D7 |
| O0D1D2D3/S4D5D6D7 | 0x66 | 11 | 0100 | D1 | D2 | D3 | Q0 - | D5 | D6 | D7 |
| O0D1D2D3/O4D5D6D7 | 0x55 | 11 | 0101 | D1 | D2 | D3 | Q0 Q4 | D5 | D6 | D7 |
| S0D1D2D3/D4D5D6D7 | 0x78 | 10 | D1 | D2 | D3 | D4 | D5 | D6 | D7 |
| O0D1D2D3/C4C5C6C7 | 0x4b | 11 | 0110 | - | D1 | D2 | D3 | - Q0 | $C_4$ $C_5$ | $C_6$ $C_7$ |
| T0C1C2C3/C4C5C6C7 | 0x87 | 11 | 0111 | - | $C_1$ | $C_2$ $C_3$ | $C_4$ $C_5$ | $C_6$ | $C_7$ |
| D0T1C2C3/C4C5C6C7 | 0x99 | 11 | 1000 | - | D0 | - | $C_2$ $C_3$ | $C_4$ $C_5$ | $C_6$ | $C_7$ |
| D0D1T2C3/C4C5C6C7 | 0xaa | 11 | 1001 | - | D0 | D1 | - | $C_3$ $C_4$ $C_5$ | $C_6$ | $C_7$ |
| D0D1D2T3/C4C5C6C7 | 0xb4 | 11 | 1010 | - | D0 | D1 | D2 | - | $C_4$ $C_5$ | $C_6$ | $C_7$ |
| D0D1D2D3/T4C5C6C7 | 0xcc | 11 | 1011 | - | D0 | D1 | D2 | D3 | - | $C_5$ | $C_6$ | $C_7$ |
| D0D1D2D3/D4T5C6C7 | 0xd2 | 11 | 1100 | - | D0 | D1 | D2 | D3 | D4 | $C_6$ | $C_7$ |
| D0D1D2D3/D4D5T6C7 | 0xe1 | 11 | 1101 | D0 | D1 | D2 | D3 | D4 | D5 | $C_7$ |
| D0D1D2D3/D4D5D6T7 | 0xff | 01 | $D_0$ | D1 | D2 | D3 | D4 | D5 | D6 |
| | | 00 | Resv | | | | | | |
| | | 11 | 0000 | Resv | | | | | |
| | | 11 | 1110 | Resv | | | | | |
| | | 11 | 1111 | Resv | | | | | |

FIG. 6

| | | | | | | | | | | | | |
|---|---|---|---|---|---|---|---|---|---|---|---|---|
| 1 | 00010 | 0 | 11 | 0010 | - | $C_0$ | $C_1$ | $C_2$ | $C_3$ | - | $Q_4$ | D5 | D6 | D7 |
| | 00100 | 0 | 11 | 0001 | - | $C_0$ | $C_1$ | $C_2$ | $C_3$ | - | $C_4$ | $C_5$ | $C_6$ | $C_7$ |
| | 00101 | 0 | 11 | 0011 | - | $C_0$ | $C_1$ | $C_2$ | $C_3$ | - | D5 | D6 | D7 |
| | 01000 | 0 | 11 | 0100 | D1 | D2 | D3 | Q0 | - | D5 | D6 | D7 |
| | 01001 | 0 | 11 | 0101 | D1 | D2 | D3 | Q0 | Q4 | D5 | D6 | D7 |
| | 01100 | 0 | 10 | D1 | D2 | D3 | D4 | D5 | D6 | D7 |
| | 01101 | 0 | 11 | 1011 | - | D0 | D1 | D2 | D3 | - | $C_5$ | $C_6$ | $C_7$ |
| | 01111 | 1 | 11 | 1100 | - | D0 | D1 | D2 | D3 | D4 | $C_6$ | $C_7$ |
| $D_0$ | $D_1$ | $D_2$ | $D_3$ | $D_4$ | $D_5$ | $D_6$ | $D_7$ |
| $D_0$ | $D_1$ | $D_2$ | $D_3$ | $D_4$ | $D_5$ | $D_6$ | $D_7$ |
| $D_0$ | $D_1$ | $D_2$ | $D_3$ | $D_4$ | $D_5$ | $D_6$ | $D_7$ |
| $D_0$ | $D_1$ | $D_2$ | $D_3$ | $D_4$ | $D_5$ | $D_6$ | $D_7$ |
| $D_0$ | $D_1$ | $D_2$ | $D_3$ | $D_4$ | $D_5$ | $D_6$ | $D_7$ |
| $D_0$ | $D_1$ | $D_2$ | $D_3$ | $D_4$ | $D_5$ | $D_6$ | $D_7$ |
| $D_0$ | $D_1$ | $D_2$ | $D_3$ | $D_4$ | $D_5$ | $D_6$ | $D_7$ |
| $D_0$ | $D_1$ | $D_2$ | $D_3$ | $D_4$ | $D_5$ | $D_6$ | $D_7$ |

SENDING METHOD, RECEIVING AND PROCESSING METHOD AND APPARATUS FOR ADAPTING PAYLOAD BANDWIDTH FOR DATA TRANSMISSION

CROSS-REFERENCE TO RELATED APPLICATIONS

This application is a continuation of International Patent Application No. PCT/CN2008/071372, filed on Jun. 19, 2008, which claims priority to Chinese Patent Application No. 200710112406.9, filed on Jun. 21, 2007, both of which are hereby incorporated by reference in their entireties.

FIELD OF THE TECHNOLOGY

The present invention relates to the field of communications, and more particularly to a technology of adapting a payload bandwidth for data transmission.

BACKGROUND OF THE INVENTION

When transmitting service data, a communication system encodes the service data to be transmitted through an encoding scheme adapted for a payload bandwidth.

Currently, a 64B/66B encoding scheme (converting a 64B encoding scheme into a 66B encoding scheme) for obtaining 66B coding blocks containing 64B or a 64B/65B encoding scheme (converting the 64B encoding scheme into a 65B encoding scheme) for obtaining 65B coding blocks containing 64B is commonly used in the 10 Gigabit Ethernet (10 GE) standard. FIG. 1 shows a structure of a 66B coding block. It can be seen that, the 66B coding block contains two types of payload blocks, which are identified by a Syn field occupying two bits, with Syn=01 representing a data block containing data only, and Syn=10 representing a control block containing control characters. There are 15 different types of control blocks containing control characters, which are identified by a Block Type Field occupying the first eight bits after the Syn.

The control character includes C code, O code, /S/ code, and /T/ code. The C code occupies seven bits, the O code occupies four bits, and the /S/ code and the /T/ code are removed according to the encoding rule during encoding.

A 65B coding block has a structure similar to that of the 66B coding block, except that the Syn field of the 65B coding block occupies only one bit.

With the increasing bandwidth requirements caused by the increase in people's demand for voice, data, multimedia, and other services, the OTN has gradually become a core platform for bearer services of various operators. Transmission of service data on the OTN using the 10 GE or 40 Gigabit Ethernet (40 GE) standard is currently considered a hot topic.

FIG. 2 shows a structure of an OTN frame. It can be seen that, the OTN frame includes an optical channel payload unit-k (OPUk) payload, an optical channel transport unit-k (OTUk) forward error correction (FEC), and the following overhead (OH) portion caused by transmitting the payload:

OPUk OH; optical channel data unit-k (ODUk) OH; and OTUk OH.

OPU types and capacity corresponding to the OPUk are as shown in Table 1.

TABLE 1

| OPU type | OPU Payload nominal bit rate | OPU Payload bit rate tolerance |
|---|---|---|
| OPU1 | 2 488 320 kbit/s | ±20 ppm |
| OPU2 | 238/237 × 9 953 280 kbit/s | |
| OPU3 | 238/236 × 39 813 120 kbit/s | |
| OPU1-Xv | X * 2 488 320 kbit/s | ±20 ppm |
| OPU2-Xv | X * 238/237 * 9 953 280 kbit/s | |
| OPU3-Xv | X * 238/236 * 39 813 120 kbit/s | |

NOTE -
The nominal OPUk Payload rates are approximately: 2 488 320.000 kbit/s (OPU1 Payload), 9 995 276.962 kbit/s (OPU2 Payload) and 40 150 519.322 kbit/s (OPU3 Payload). The nominal OPUk-Xv Payload rates are approximately: X*2 488 320.000 kbit/s (OPU1-Xv Payload), X*9 995 276.962 kbit/s (OPU2-Xv Payload) and X*40 150 519.322 kbit/s (OPU3-Xv Payload).

It can be seen that, the payload bandwidth of the OPU2 is 9.995276962 GBits/s, and the payload bandwidth of the OPU3 is 40.150519322 GBits/s.

In order to transmit 10 GE MAC frames (containing data and control codes), a payload bandwidth of at least 10 GBits/s is required. However, since the payload bandwidth of the OPU2 of the OTN is 9.995276962 GBits/s, which is smaller than 10 GBits/s, the payload bandwidth required for transmitting 10 GE MAC frames in the OTN cannot be satisfied. Therefore, some companies proposed to extend the payload bandwidth of the OPU by using a portion of unused OPU and ODU overheads. FIG. 3 is a schematic view of an OH structure of the OTN frame. Referring to FIGS. 2 and 3, the OH suitable for extending the payload bandwidth of the OPU2 is analyzed in the following.

It can be seen from FIG. 3 that, nine Reserve (RES) bytes, namely, the first three RES bytes in the second row and six RES bytes in the fourth row in FIG. 3, may be used for bearing the load. Comparing FIG. 2 with FIG. 3, it can be seen that a portion in FIG. 3 corresponding to the $OPU_k$ OH in FIG. 2 includes a client specific portion and a payload structure identifier (PSI), and occupies eight bytes, in which the PSI occupies one byte and cannot be used for bearing the load, and the other seven bytes may be used for bearing the load. In this way, the 16 bytes may be used for bearing the load, thereby extending the payload bandwidth of the OPU2.

After the payload bandwidth of the OPU2 is extended, the payload bandwidth of the OPU2 may be increased to (3808*4+16)/(3808*4)*9.995276962 GBits/s=10.005776202 GBits/s. The value is slightly higher than the rate of 10 GBits/s. However, if the 10 GE uses the 64B/66B encoding scheme, a linear rate of (66/64)*10 GBits/s=10.3125 GBits/s is required, which is still higher than the increased payload bandwidth of the OPU2. Therefore, the payload bandwidth required for transmitting MAC frames of the 10 GE standard in the OTN cannot be satisfied if the 64B/66B encoding scheme is directly used.

In addition, in order to transmit 40 GE MAC frames, a payload bandwidth of at least 40 GBits/s is required. However, since the payload bandwidth of the OPU3 of the OTN is 40.150519322 GBits/s, which is higher than 40 GBits/s, the transmission of 40 GE MAC frames in the OTN may be achieved. However, if the 64B/65B encoding scheme is directly used for encoding 40 GE signals, a linear rate of 65/64*40 GBits/s=40.625 GBits/s is required. If the 64B/66B encoding scheme is used, a linear rate of 66/64*40 GBits/s=41.25 GBits/s is required. The two linear rates are both higher than the payload bandwidth of the OPU3 of the OTN. Therefore, the payload bandwidth required for transmitting MAC frames of the 40 GE standard in the OTN cannot be satisfied if the 64B/66B encoding scheme or the 64B/65B encoding scheme (with the Syn field being changed to one bit) is directly used.

SUMMARY OF THE INVENTION

Accordingly, the present invention is directed to a sending method, a receiving and processing method and an apparatus for adapting a payload bandwidth for data transmission, which satisfy the payload bandwidth required for transmitting MAC frames of the 40 GE or 10 GE standard in an OTN.

The present invention is realized through the following technical solutions.

In an embodiment, the present invention provides a sending method for adapting a payload bandwidth for data transmission, which includes the following steps.

N coding blocks containing 64B are acquired, in which N is an integer greater than or equal to 2.

The acquired N coding blocks are converted into a (64*N+1)B coding block.

The (64*N+1)B coding block obtained by conversion is sent.

In an embodiment, the present invention further provides a sending device, which includes a first acquisition unit, a first conversion unit, and a first transmission unit.

The first acquisition unit is adapted to acquire N coding blocks containing 64B, in which N is an integer greater than or equal to 2.

The first conversion unit is adapted to convert the acquired N coding blocks into a (64*N+1)B coding block.

The first transmission unit is adapted to send the (64*N+1)B coding block obtained by conversion.

In an embodiment, the present invention further provides a receiving and processing method for adapting a payload bandwidth for data transmission, which includes the following steps.

A (64*N+1)B coding block is acquired, in which N is an integer greater than or equal to 2.

The (64*N+1)B coding block is decoded to recover N coding blocks containing 64B.

The recovered N coding blocks containing 64B are sent.

In an embodiment, the present invention further provides a receiving and processing device, which includes a second acquisition unit, a second conversion unit, and a second transmission unit.

The second acquisition unit is adapted to acquire a (64*N+1)B coding block, in which N is an integer greater than or equal to 2.

The second conversion unit is adapted to decode the (64*N+1)B coding block to recover N coding blocks containing 64B.

The second transmission unit is adapted to send the recovered N coding blocks containing 64B.

It can be seen from the technical solutions of the present invention that, N coding blocks containing 64B are acquired, in which N is an integer greater than or equal to 2, and the acquired N coding blocks are converted into a (64*N+1)B coding block, so that a required linear rate is reduced after conversion, thereby reducing the requirements for the payload bandwidth of a bearer layer, and satisfying the payload bandwidth required for transmitting 40 GE or 10 GE MAC frames in an OTN.

BRIEF DESCRIPTION OF THE DRAWINGS

FIG. 1 shows a structure of a 66B coding block in the prior art;

FIG. 5 is a schematic structural view of a 60B coding block obtained by converting 66B coding blocks containing 64B according to the first embodiment of the present invention;

FIG. 6 is a schematic structural view of a 58B coding block obtained by converting 66B coding blocks containing 64B according to the first embodiment of the present invention;

FIG. 8 is a structural view of a 58B coding block obtained by conversion according to the first embodiment of the present invention;

FIG. 10 is a schematic view of a decoding process for decoding a (64*N+1)B coding block to recover N 66B coding blocks containing 64B.

DETAILED DESCRIPTION OF THE EMBODIMENTS

Figure 2:
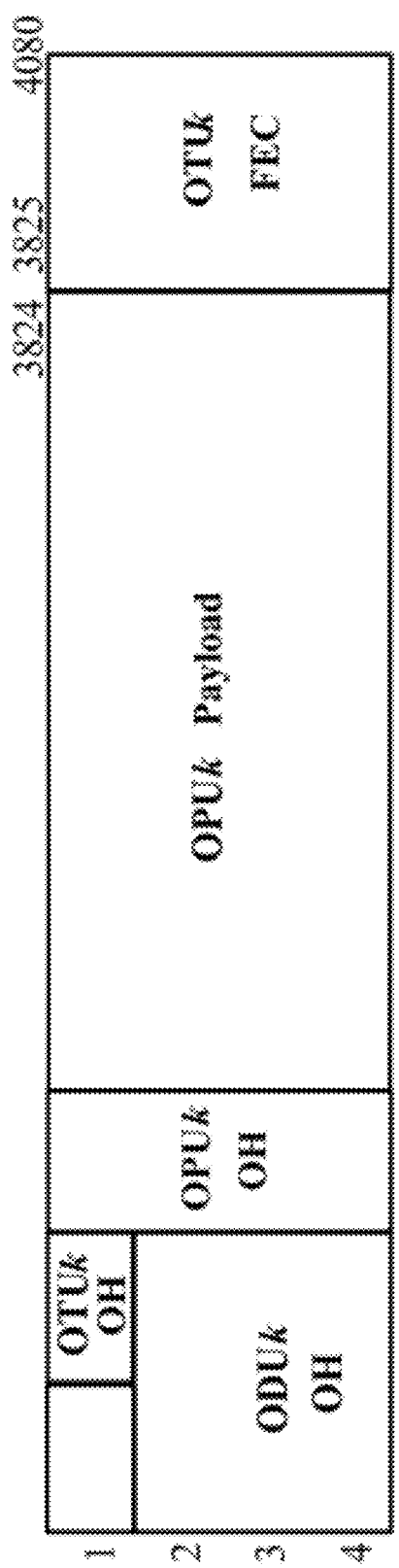
FIG. 2 shows a structure of an OTN frame in the prior art.

In a first embodiment, the present invention provides a sending method for adapting a payload bandwidth for data transmission, which is capable of converting N 66B coding blocks containing 64B obtained through the 64B/66B encoding scheme into a (64*N+1)B coding block, thereby adapting a payload bandwidth of an OTN. In the first embodiment of the present invention, the possibility of converting N 66B coding blocks into a (64*N+1)B coding block is analyzed as follows.

It can be seen by analyzing the frame structure of the 66B coding block that, the Block Type Field occupying the first eight bits after the Syn identifies only 15 types of control blocks. Considering that four bits can identify up to $2^4=16$ types, which can satisfy the requirements for identifying the 15 types of control blocks, four bits can be saved.

In the frame structure of the 66B coding block, the Syn occupying two bits is used to identify whether a payload block in the coding block is a data block containing data only or a control block containing control characters. In the first embodiment of the present invention, it is considered that one bit or two bits may be used to identify whether a payload block following a certain control block containing control characters in the coding block is a control block containing control characters or a data block containing data only. The identifier is still named Syn. If one bit is used, one bit is saved as compared with the Syn field in the original 66B coding block, so that the total number of bytes of the coding block can be reduced, thereby further reducing the payload bandwidth for bearing the coding block.

Since the positions of the control blocks need to be changed when the encoding scheme is converted, and the Syn for identifying whether a payload block is a control block containing control characters can only indicate whether a certain control block contains control characters, a control block containing control characters must use a corresponding identifier to identify a block point thereof in the 66B coding block.

The identifier is named Block Point (BP), and the maximum number of bits occupied by the identifier BP can determine a maximum value of the number N of 66B coding blocks that can be converted. In addition, the control block containing the control characters also needs to use a corresponding identifier to indicate whether the subsequent control block contains control characters. The identifier is named Last Control Block (LC), and may occupy one bit.

The number of bits occupied by the BP is determined below.

Encoding rates of (64*N)B coding blocks and (64*N+1)B coding blocks obtained after encoding are calculated according to various values of N, and the data shown in Table 2 is obtained.

TABLE 2

| N | 64*N | 64*N + 1 | Encoding Rate/ Payload Rate | Encoding Rate under 10 GBits/s Payload | Encoding Rate under 40 GBits/s Payload | Encoding Rate under 100 GBits/s Payload |
|---|---|---|---|---|---|---|
| 1 | 64 | 65 | 1.015625000000 | 10.156250000000 | 40.625000000000 | 101.562500000000 |
| 2 | 128 | 129 | 1.007812500000 | 10.078125000000 | 40.312500000000 | 100.781250000000 |
| 3 | 192 | 193 | 1.005208333333 | 10.052083333333 | 40.208333333333 | 100.520833333333 |
| 4 | 256 | 257 | 1.003906250000 | 10.039062500000 | 40.156250000000 | 100.390625000000 |
| 5 | 320 | 321 | 1.003125000000 | 10.031250000000 | 40.125000000000 | 100.312500000000 |
| 6 | 384 | 385 | 1.002604166667 | 10.026041666667 | 40.104166666667 | 100.260416666667 |
| 7 | 448 | 449 | 1.002232142857 | 10.022321428571 | 40.089285714286 | 100.223214285714 |
| 8 | 512 | 513 | 1.001953125000 | 10.019531250000 | 40.078125000000 | 100.195312500000 |
| 9 | 576 | 577 | 1.001736111111 | 10.017361111111 | 40.069444444444 | 100.173611111111 |
| 10 | 640 | 641 | 1.001562500000 | 10.015625000000 | 40.062500000000 | 100.156250000000 |
| 11 | 704 | 705 | 1.001420454545 | 10.014204545455 | 40.056818181818 | 100.142045454545 |
| 12 | 768 | 769 | 1.001302083333 | 10.013020833333 | 40.052083333333 | 100.130208333333 |
| 13 | 832 | 833 | 1.001201923077 | 10.012019230769 | 40.048076923077 | 100.120192307692 |
| 14 | 896 | 897 | 1.001116071429 | 10.011160714286 | 40.044642857143 | 100.111607142857 |
| 15 | 960 | 961 | 1.001041666667 | 10.010416666667 | 40.041666666667 | 100.104166666667 |
| 16 | 1024 | 1025 | 1.000976562500 | 10.009765625000 | 40.039062500000 | 100.097656250000 |
| 17 | 1088 | 1089 | 1.000919117647 | 10.009191176471 | 40.036764705882 | 100.091911764706 |
| 18 | 1152 | 1153 | 1.000868055556 | 10.008680555556 | 40.034722222222 | 100.086805555556 |
| 19 | 1216 | 1217 | 1.000822368421 | 10.008223684211 | 40.032894736842 | 100.082236842105 |
| 20 | 1280 | 1281 | 1.000781250000 | 10.007812500000 | 40.031250000000 | 100.078125000000 |
| 21 | 1344 | 1345 | 1.000744047619 | 10.007440476191 | 40.029761904762 | 100.074404761905 |
| 22 | 1408 | 1409 | 1.000710227273 | 10.007102272727 | 40.028409090909 | 100.071022727273 |
| 23 | 1472 | 1473 | 1.000679347826 | 10.006793478261 | 40.027173913044 | 100.067934782609 |
| 24 | 1536 | 1537 | 1.000651041667 | 10.006510416667 | 40.026041666667 | 100.065104166667 |
| 25 | 1600 | 1601 | 1.000625000000 | 10.006250000000 | 40.025000000000 | 100.062500000000 |
| 26 | 1664 | 1665 | 1.000600961538 | 10.006009615385 | 40.024038461539 | 100.060096153846 |
| 27 | 1728 | 1729 | 1.000578703704 | 10.005787037037 | 40.023148148148 | 100.057870370370 |
| 28 | 1792 | 1793 | 1.000558035714 | 10.005580357143 | 40.022321428571 | 100.055803571429 |
| 29 | 1856 | 1857 | 1.000538793103 | 10.005387931035 | 40.021551724138 | 100.053879310345 |
| 30 | 1920 | 1921 | 1.000520833333 | 10.005208333333 | 40.020833333333 | 100.052083333333 |
| 31 | 1984 | 1985 | 1.000504032258 | 10.005040322581 | 40.020161290323 | 100.050403225806 |
| 32 | 2048 | 2049 | 1.000488281250 | 10.004882812500 | 40.019531250000 | 100.048828125000 |

In order to achieve the payload bandwidth required for bearing 40 GE MAC frames on the OPU3 of the OTN, the linear rate of the 66B coding block obtained after encoding should be lower than the payload bandwidth of the OPU3 of 40.150519322 GBits/s. It can be seen from FIG. 2 that, at this time, the value of N needs to be greater than or equal to 5, and at least three bits are needed for identifying the block point of the control block containing the control characters in the original 64B coding block, that is to say, the BP occupies at least three bits.

In this case, the BP and the LC need to occupy four bits in total. Since the Block Type Field in the 66B coding block structure has eight bits, four bits are left. The four bits may indicate 16 types of control blocks, and thus can satisfy the requirements for representing the 15 types of control blocks in the original 66B coding block structure.

In this case, when N 66B coding blocks are converted into a (64*N+1)B coding block, a BT occupying four bits is used for representing the original 15 data types, the code content in the subsequent control block corresponding to each data type identified by the BT remains unchanged, an LC occupying one bit is used for identifying whether a control block following the control block contains control characters is a control block containing control characters or a control block containing data only. In this way, corresponding to the eight bits occupied by the Block Type Field for identifying the types of the control blocks in the original 66B coding block, three bits are left, which may be used for identifying the position of the control block in the original 66B coding block, that is, the BP occupies three bits at most. Thus, the maximum value of the number N of 66B coding blocks is 8.

Figure 3:
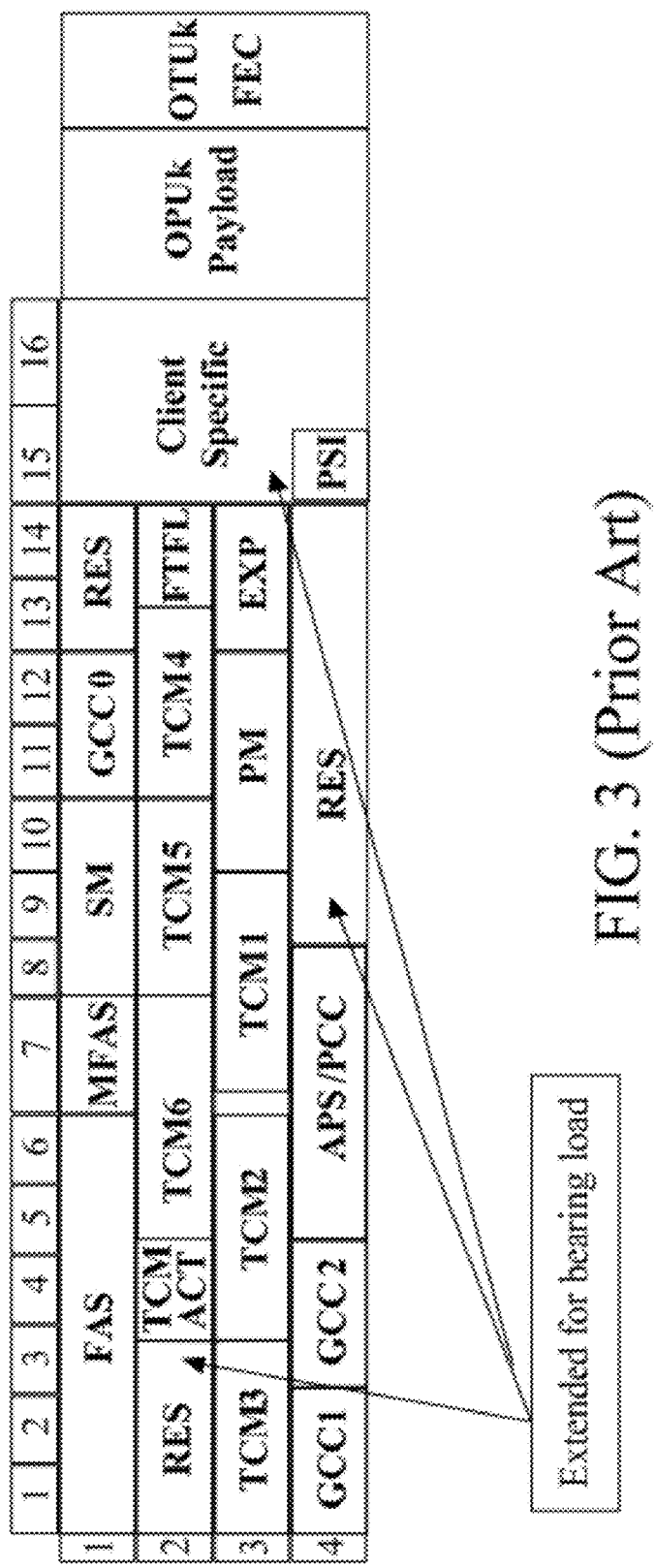
FIG. 3 is a schematic view of an OH structure of the OTN frame in the prior art.

In order to satisfy the payload bandwidth required for bearing 10 GE MAC frames on the OPU2 of the OTN, the linear rate of the 66B coding blocks obtained after encoding should be lower than the extended payload bandwidth of the OPU2 of 10.005776202 GBits/s. It can be seen from FIG. 3 that, at this time, the value of N needs to be greater than or equal to 28. Since $2^4 < 28 < 2^5$, at least five bits need to be used for identifying the block point of the control block containing the control characters in the original 66B coding block, that is to say, the BP at least needs to occupy five bits.

It can be seen that, in this case, the BP and the LC need to occupy six bits in total. As eight bits are occupied by the Block Type Field for identifying the types of the control blocks in the original 66B coding block, the rest two bits may be used to set an identifier BT for indicating four types of control blocks, which obviously cannot satisfy the requirements for representing the 15 types of control blocks in the original 66B coding block structure. Therefore, other methods need to be used, so as to save the bits, and use the bits in combination with the BT to satisfy the requirements for representing the 15 data types of control blocks in the original 66B coding block structure.

In the 10 GE standard, only 12 types of control characters exist, including one type of /S/ code, one type of /T/ code, eight types of C code, and two types of O code. Each type of code occupies eight bits. The /S/ code and the /T/ code are removed according to the encoding rule during encoding. Corresponding to the 15 types of control blocks in the 66B coding block structure as shown in FIG. 1, nine types of control blocks having idle bits are control blocks with the /S/ code and the /T/ code removed, namely, control blocks corresponding to type identifiers 0x33, 0x66, 0x87, 0x99, 0xaa, 0xb4, 0xcc, 0xd2, and 0xe1 as shown in FIG. 1. In addition, among the other six types of control blocks, four types of control blocks contain the C code and/or the O code, namely, control blocks corresponding to type identifiers 0x1e, 0x2d, 0x55, and 0x4b as shown in FIG. 1, and two types of control blocks do not contain any control character (but contain data only), namely, control blocks corresponding to type identifiers 0x78 and 0xff as shown in FIG. 1.

The 13 types of control blocks containing control characters may be compressed. After the 13 types of control blocks containing control characters are compressed, some space is available. For example, a space occupying four bits may be available, and an identifier Block Type Extend (BTX) may be set in the space to identify the corresponding compressed data blocks.

For the two types of control blocks containing data only, there is no space for compression. Since the nine types of control blocks with the /S/ code and the /T/ code removed have idle bits, the control blocks may be compressed. Since only eight types of C code exist and only two types of O code exist, the space occupied by the C code and the O code may be further compressed. For example, four bits rather than eight bits are used for representing the C code, and two bits rather than eight bits are used for representing the O code. In this way, the original code content is maintained, and meanwhile, expandable space is reserved. As shown in Table 3, the last two columns show types represented by the C code and the O code after compression. The C code uses four bits, and the O code uses two bits. The last two columns are respectively corresponding to types represented by the C code and the O code before space compression corresponding to the original XGMII encoding in the fourth and fifth columns.

content in the control blocks containing data only remains unchanged, the space occupied by control characters in each control block containing the control characters is compressed, and the bits corresponding to the space are used to identify the corresponding compressed control block, in which the identifier is marked BTX.

The specific method for compressing the control characters in the control blocks is not limited in the present invention, as long as the purpose of field compression can be achieved.

Control blocks that can be compressed are taken as a control block group of one type, a space occupied by a field identifying types of the control blocks is determined according to the control block group and the number of control blocks that cannot be compressed, and an identifier BT is set in the space to identify the types of the control blocks.

For example, corresponding to the 15 types of control blocks of the 66B coding block, the control blocks that can be compressed are taken as a control block group of one type, and the other two types of control blocks which contain data only and cannot be compressed may be separately identified, so a total of three types of control blocks need to be identified. Therefore, two bits may be used for identification, for example, the type of the control block group obtained by compression is identified by BT=11, and the two types of control blocks containing data only are respectively identified by BT=01 and BT=10.

Since all the compressed control blocks are taken as the control block group of one type, it can be known that a control block following the last control block in the control block group does not contain any control character and is a control block containing data only, as long as the last control block is identified. A space corresponding to one bit may be used to set an identifier LC to identify the last control block in the control block group.

Since the Block Type Field for identifying the types of the control blocks in the 66B coding block uses eight bits, the BT for identifying the block types of the control blocks occupies two bits, and the LC for identifying the last control block in the control block group occupies one bit, it may be determined that an identifier occupying five bits can be used for identifying the positions of the control blocks in the original 66B coding block, in which the identifier is marked BP.

TABLE 3

| Control Character | Notation | XGMII Control Code | 10 GBASE-R Control Code | 10 GBASE-R O Code | 8B/10B Codea | C Code | O Code |
|---|---|---|---|---|---|---|---|
| idle | /I/ | 0x07 | 0x00 | | K28.0 or K28.3 or K28.5 | 0x0 | |
| start | /S/ | 0xfb | Encoded by block type field | | K27.7 | | |
| terminate | /T/ | 0xfd | Encoded by block type field | | K29.7 | | |
| error | /E/ | 0xfe | 0x1e | | K30.7 | 0x1 | |
| Sequence ordered_set | /Q/ | 0x9c | Encoded by block type field plus O code | 0x0 | K28.4 | | 0x0 |
| reserved0 | /R/ | 0x1c | 0x2d | | K28.0 | 0x2 | |
| reserved1 | | 0x3c | 0x33 | | K28.1 | 0x3 | |
| reserved2 | /A/ | 0x7c | 0x4b | | K28.3 | 0x4 | |
| reserved3 | /K/ | 0xbc | 0x55 | | K28.5 | 0x5 | |
| reserved4 | | 0xdc | 0x66 | | K28.6 | 0x6 | |
| reserved5 | | 0xf7 | 0x78 | | K23.7 | 0x7 | |
| Signal ordered_set | /Fsig/ | 0x5c | Encoded by block type field plus O code | 0xF | K28.2 | | 0x2 |

Based on the above consideration, when N 66B coding blocks are converted into a (64*N+1)B coding block, the code Since only the space occupying five bits can be used for identifying the positions of the control blocks in the original 64B coding block, the maximum value of the number N of 64B/66B coding blocks that can be converted is $2^5=32$.

Figure 4:
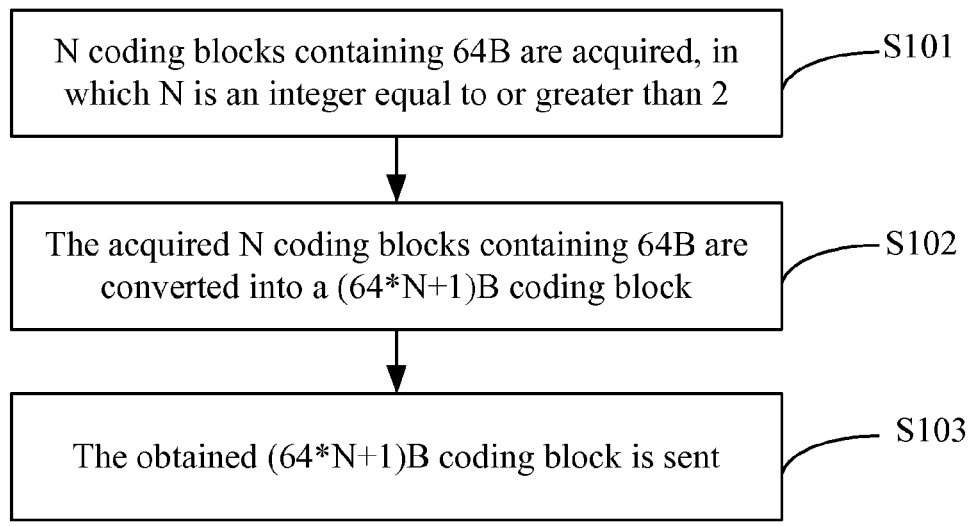
FIG. 4 is a flow chart according to a first embodiment of the present invention.

Based on the above analysis, the method according to the first embodiment of the present invention includes the following steps, as shown in FIG. 4.

In step S101, N coding blocks containing 64B are acquired, in which N is an integer greater than or equal to 2.

Taking 66B coding blocks containing 64B as an example, a data stream of coding block obtained through the 64B/66B encoding scheme is received through a data interface using the 64B/66B encoding scheme, and N 66B coding blocks containing 64B contained in the data stream of coding block are acquired.

In step S102, the acquired N coding blocks containing 64B are converted into a (64*N+1)B coding block.

Still taking 66B coding blocks containing 64B as an example, N 66B coding blocks containing 64B are converted into a (64*N+1)B coding block, which may be implemented through the following two solutions.

First Solution

The N 66B coding blocks containing 64B are decoded to obtain data blocks containing data only and different types of control blocks containing control characters.

The control blocks containing the control characters are placed into a control block buffer as a control block group, an identifier Syn is set to identify the control block group, an identifier LC is set to identify a last control block in the control block group, and the data blocks containing data only are placed, as a data block group, into a buffer containing data blocks only. A space occupied by the identifier Syn for identifying the control block group may be equal to or smaller than the space occupied by the Syn field for identifying control blocks containing control characters in the original 66B coding blocks containing 64B.

Four bits are used to set an identifier BT to identify a block type of each control block, in which the block type is corresponding to a block type of each control block in the 66B coding blocks containing 64B.

A space smaller than or equal to three bits is used to set an identifier BP to identify the positions of the control blocks in the original 66B coding blocks containing 64B.

In this solution, $N \leq 8$.

FIG. 5 is a schematic structural view of a 60B coding block obtained by converting 66B coding blocks containing 64B. It can be seen by comparing FIG. 1 with FIG. 5 that, the 15 types of control blocks represented by eight bits in the 66B coding blocks containing 64B are represented by four bits in the 60B coding block, for example, 1, 2, 3, 4, 5, 6, 7, 8, 9, A, B, C, D, E, and F are corresponding to the original 15 data types in the 66B coding blocks containing 64B; in the 60B coding block, the LC uses one bit to represent whether a control block following a control block containing control characters contains control characters; and in the 60B coding block, the BP is used for identifying the positions of the control blocks in the original 66B coding blocks containing 64B.

In this solution, the space occupied by the control characters in the control blocks may be further compressed.

Second Solution

The N 66B coding blocks containing 64B are decoded to obtain data blocks containing data only and different types of control blocks containing control characters.

The control blocks containing the control characters are placed into a control block buffer as a control block group, an identifier Syn is set to identify the control block group, an identifier LC is set to identify a last control block in the control block group, and the data blocks containing data only are placed, as a data block group, into a buffer containing data blocks only. A space occupied by the identifier Syn for identifying the control block group may be equal to or smaller than the space occupied by the Syn field for identifying control blocks containing control characters in the original 66B coding blocks containing 64B.

Two bits are used to set an identifier BT to identify the following block types corresponding to the control blocks in the control block group: a type of control blocks containing O code and/or C code, a type of control blocks containing removed /S/ code, and a type of control blocks containing removed /T/ code; the space occupied by O code and/or C code in the control blocks containing the O code and/or the C code is compressed, bits corresponding to the compressed space are used to set an identifier BTX to identify types corresponding to the compressed control blocks, and the BTX is combined with the BT to uniquely identify the block types of the control blocks in the original 66B coding blocks containing 64B.

A space smaller than or equal to five bits is used to set an identifier BP to identify the positions of the control blocks in the original 66B coding blocks containing 64B.

In this solution, $N \leq 32$.

FIG. 6 is a schematic structural view of a 58B coding block obtained by converting 66B coding blocks containing 64B. It can be seen by comparing FIG. 1 with FIG. 6 that, the 15 types of control blocks represented by eight bits in the 66B coding blocks containing 64B are represented by two bits in the 58B coding block, for example, 01, 10, and 11 occupying two bits are corresponding to the original 15 data types in the 66B coding blocks containing 64B, with 01 and 10 corresponding to control blocks containing data only in the 66B coding blocks containing 64B, and 11 corresponding to control blocks containing control characters in the 66B coding blocks containing 64B, in which the control blocks are compressed control blocks. In order to distinguish the compressed control blocks, a space obtained after compressing the control blocks is used to set an identifier BTX to identify the compressed control blocks. In the 58B coding block, the LC uses one bit to represent whether a control block following a control block containing control characters contains control characters; and in the 58B coding block, the BP is used for identifying the positions of the control blocks in the original 66B coding blocks containing 64B.

Figure 7A:
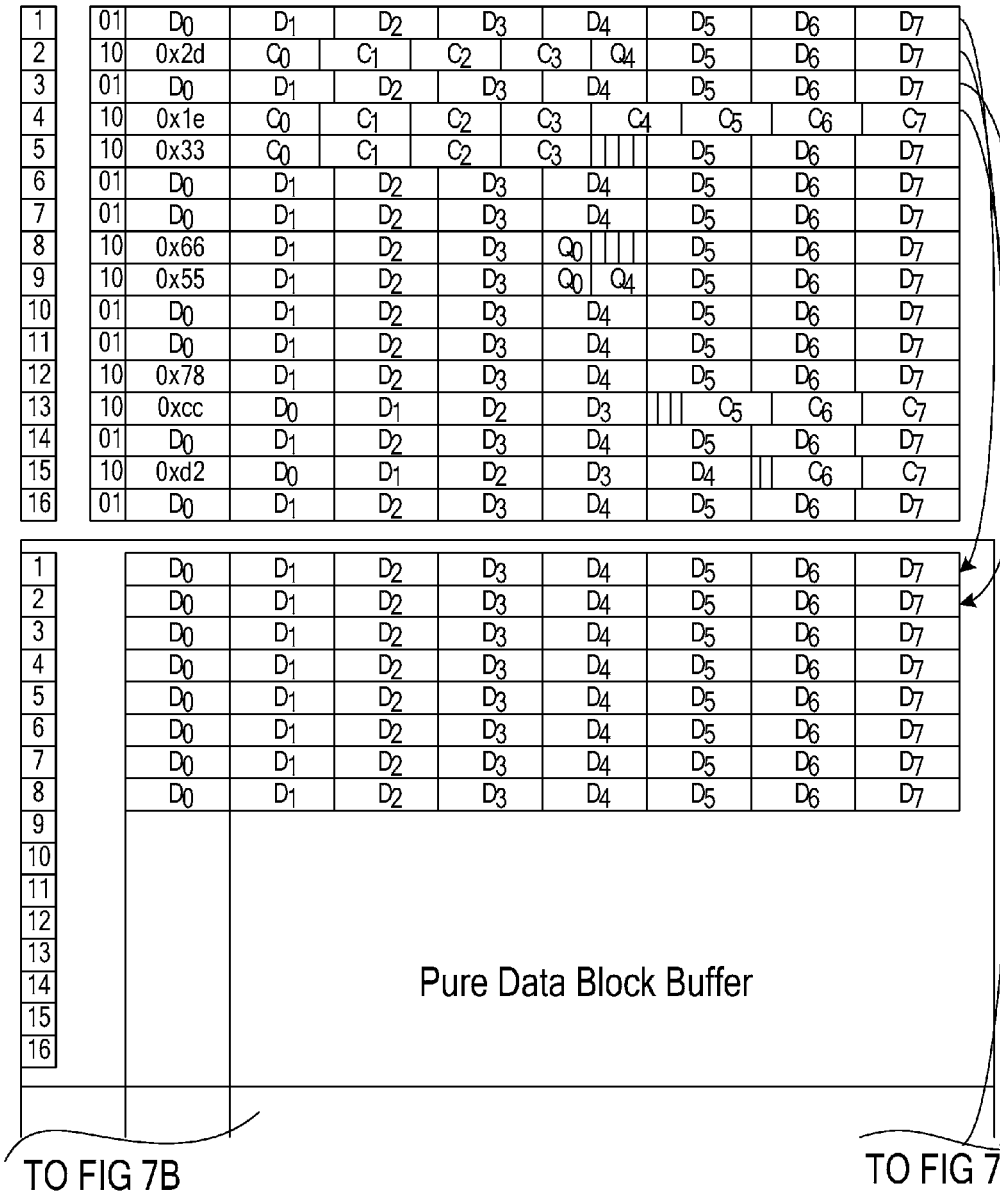
FIG. 7A-7B is a schematic view of an encoding process for converting N 66B coding blocks containing 64B into a 58B coding block according to the first embodiment of the present invention, in which N is 16.
Figure 7B:
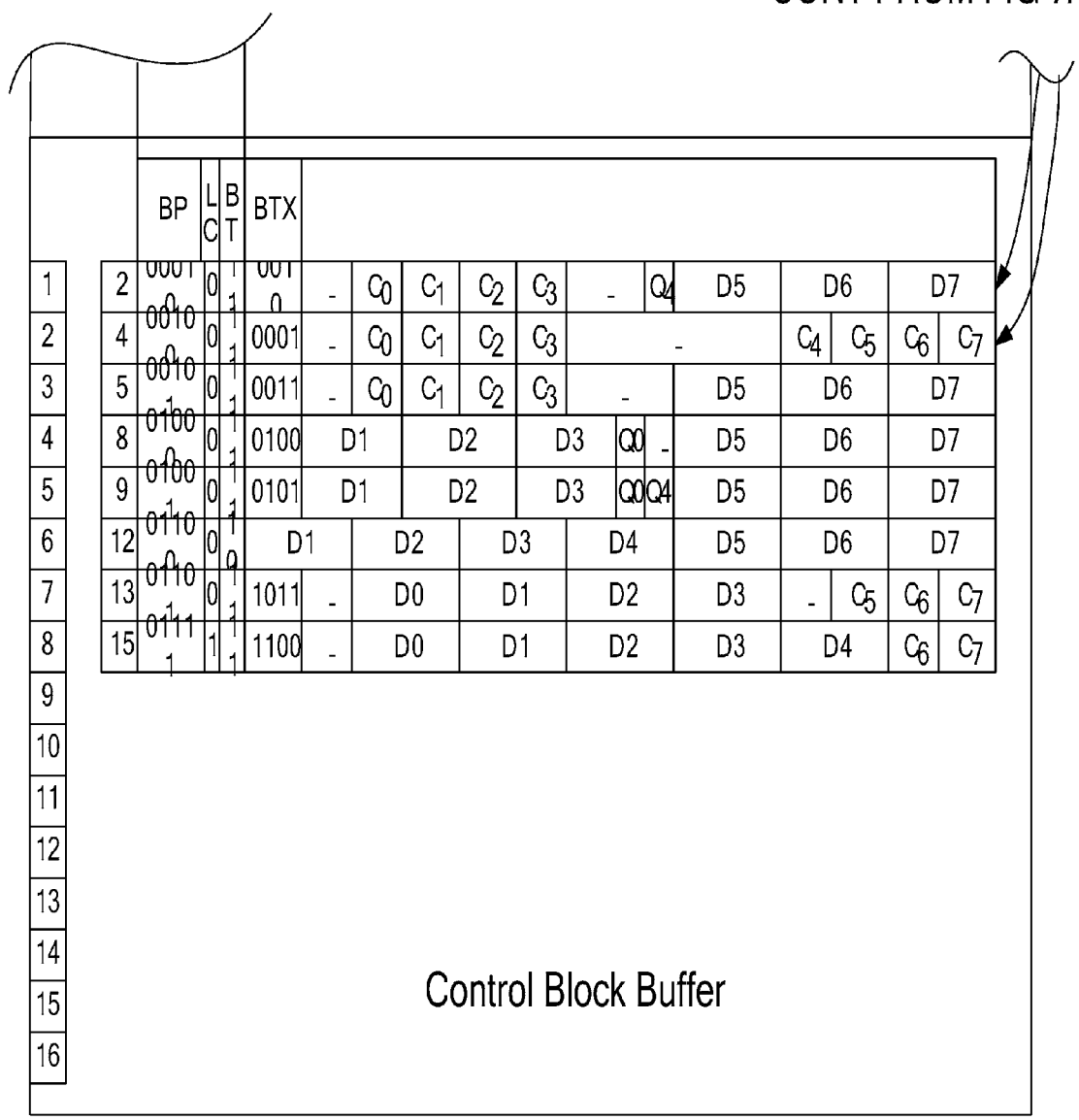

FIG. 7A-7B is a schematic view of an encoding process for converting N 66B coding blocks containing 64B into a 58B coding block, in which N is 16.

The first 66B block is a data block containing data only, and is placed into a buffer containing data blocks only.

The second 66B block is a control block containing control characters, and is re-encoded and placed into a control block buffer; BP=2, Syn is set to 1, BT=11, and meanwhile a space of the control block is compressed, and the compressed space is used to set an identifier BTX to identify the compressed control block.

The third 66B block is a data block containing data only, and is placed into the buffer for data blocks containing data only.

The fourth 66B block is a control block containing control characters, and is re-encoded and placed into a control block buffer; BP=4, Syn is set to 1, BT=11, and meanwhile a space of the control block is compressed, and the compressed space is used to set an identifier BTX to identify the compressed control block.

The above operations are repeated until the encoding process is completed.

FIG. 8 is a structural view of a 58B coding block obtained after the encoding process is completed.

The first embodiment of the present invention merely provides an instance of the process for converting N 66B coding blocks containing 64B into a (64*N+1)B coding block; however, the present invention is not limited thereto, and other methods may also be used, as long as the 66B coding blocks containing 64B can be sequentially recovered from the (64*N+1)B coding block obtained by conversion.

After the (64*N+1)B coding block is obtained by conversion through the above two methods, step S103 is performed.

In step S103, the obtained (64*N+1)B coding block is sent. The (64*N+1)B coding block may be sent through a lower-layer data transmission module.

Figure 9:
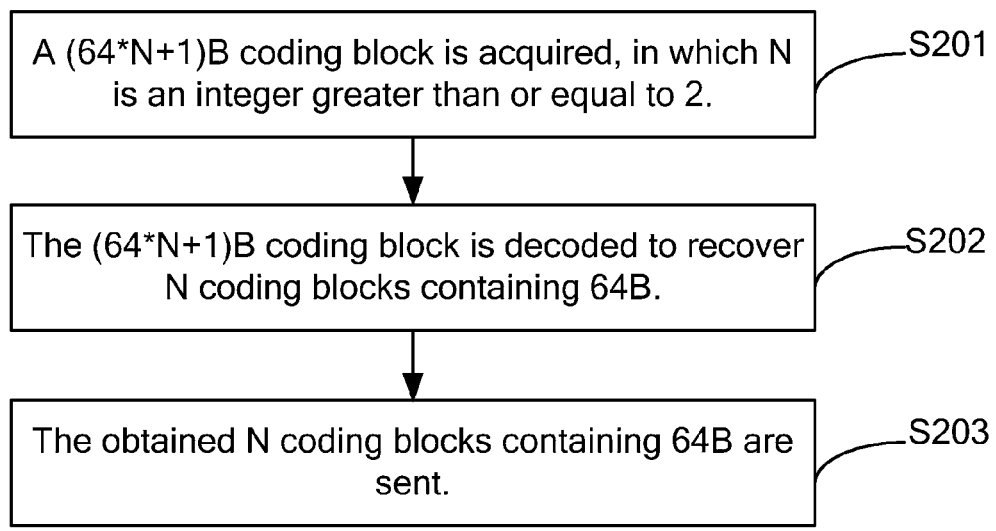
FIG. 9 is a flow chart according to a second embodiment of the present invention.

Corresponding to the first embodiment of the present invention, in a second embodiment, the present invention provides a receiving and processing method for adapting a payload bandwidth for data transmission. Referring to FIG. 9, the method includes the following steps.

In step S201, a (64*N+1)B coding block is acquired, in which N is an integer greater than or equal to 2.

The (64*N+1)B coding block may be acquired from a data stream transmitted from a lower-layer data transmission module.

In step S202, the (64*N+1)B coding block is decoded to recover N coding blocks containing 64B.

The acquired (64*N+1)B coding block is decoded to obtain an identifier Syn for identifying a control block group containing control characters, an identifier LC for identifying a last control block in the control block group, an identifier BP for identifying the positions of the control blocks in the original coding blocks containing 64B, and an identifier BT for identifying a block type of each control block.

The control block group containing the control characters and a data block group containing data only are determined according to the identifier Syn and the identifier LC.

Types of control blocks in the control block group in the coding blocks containing 64B are determined according to an identifier BTX for identifying block types of compressed control blocks and an identifier BT for identifying the block types of the control blocks.

The control blocks are recovered according to the position of the control blocks in the original coding blocks containing 64B corresponding to the identifier BP.

Figure 10:
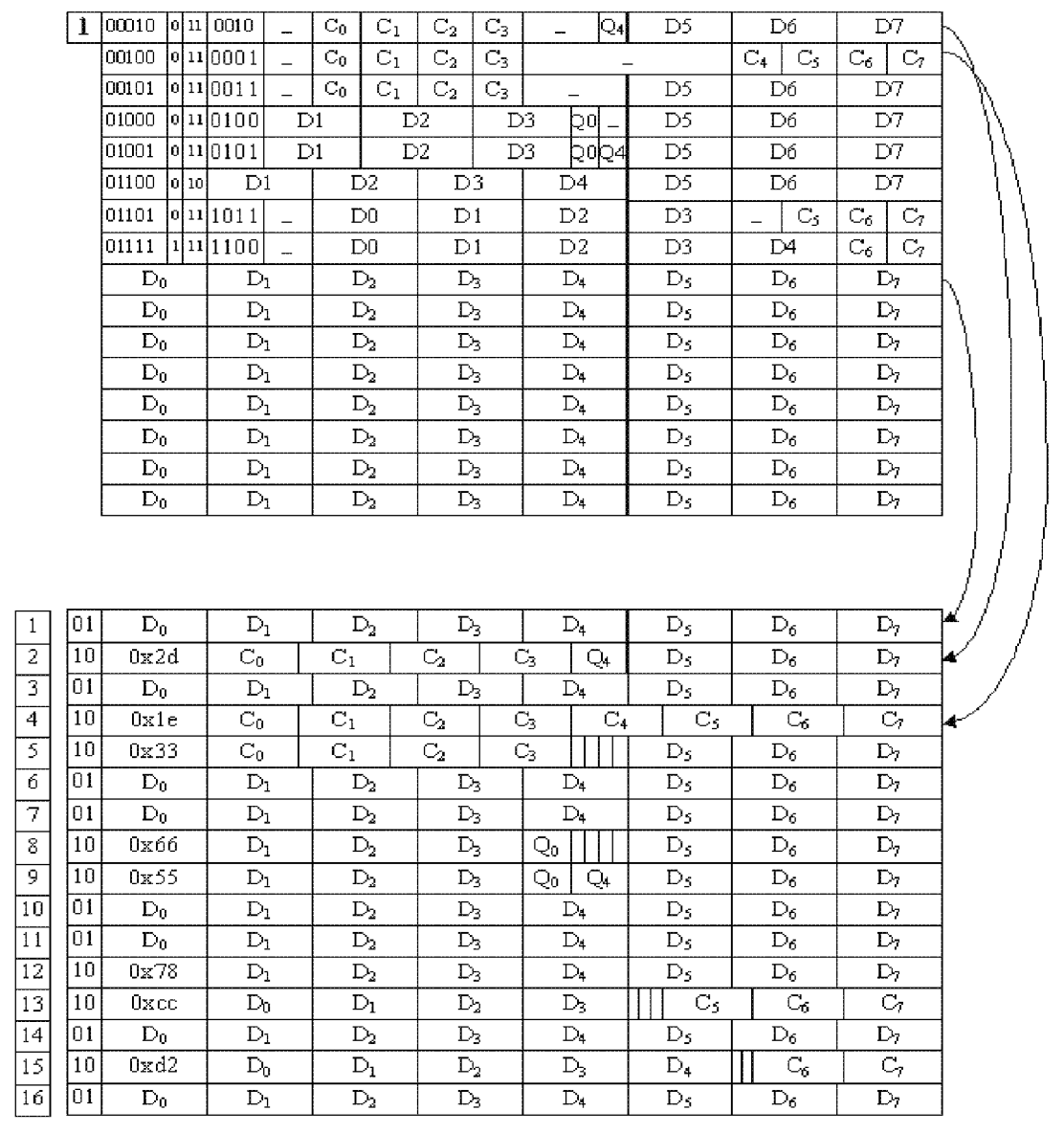

Corresponding to the instance of the encoding process for converting N 66B coding blocks containing 64B into a (64*N+1)B coding block, a decoding process is described. Referring to FIG. 10, the decoding process includes the following steps.

The acquired (64*N+1)B coding block is decoded.

Here, Syn=1, representing that the first block of the (64*N+1)B coding block is a control block, the first block is decoded according to the control block, and a control block in the 66B coding blocks containing 64B is recovered from the control block according to the BT and the BTX.

The recovered control block in the 64B/66B coding blocks is placed into the second control block in the 66B coding blocks containing 64B according to the BP, and Syn is set to 10.

The LC of the first control block of the (64*N+1)B coding block is 0, indicating that the second block is still a control block. The second block is decoded according to the control block, and a control block in the 66B coding blocks containing 64B is recovered from the control block according to the BT and the BTX; and the recovered control block in the 66B coding blocks containing 64B is placed into the second control block in the 66B coding blocks containing 64B according to the BP, and Syn is set to 10.

The above operations are repeated until the LC of the eighth control block of the (64*N+1)B coding block is 1, indicating that the following block is a data block.

Syn corresponding to the first block in a buffer of the (64*N+1)B coding block is searched out, which is 00; then, the ninth block is written to the 66B coding blocks containing 64B, and Syn is set to 01.

Syn corresponding to the third block in a buffer of the (64*N+1)B coding block is searched out, which is 00; then, the tenth block is written to the 66B coding blocks containing 64B, and Syn is set to 01.

Syn corresponding to the sixth block in a buffer of the (64*N+1)B coding block is searched out, which is 00; then, the eleventh block is written to the 66B coding blocks containing 64B, and Syn is set to 01.

In step S203, the obtained N coding blocks containing 64B are sent.

For example, the 66B coding blocks containing 64B are sent to a data interface using the 64B/66B encoding scheme, or the 65B coding blocks containing 64B are sent to a data interface using the 64B/65B encoding scheme.

The above embodiment is described by taking the process for converting N 66B coding blocks containing 64B into a (64*N+1)B coding block as an example; however, the present invention is not limited thereto, for example, the present invention may also be implemented to convert N 65B coding blocks containing 64B into a (64*N+1)B coding block and complete the corresponding decoding process.

Corresponding to the first embodiment, the present invention further provides a sending device, which includes a first acquisition unit, a first conversion unit, and a first transmission unit. The first conversion unit includes a first decoding subunit, a first control block group discrimination subunit, a first type discrimination subunit, and a first position discrimination subunit.

The first acquisition unit is adapted to acquire N coding blocks containing 64B, in which N is an integer greater than or equal to 2.

The first conversion unit is adapted to convert the acquired N coding blocks into a (64*N+1)B coding block. The specific implementation is as follows.

The first decoding subunit is adapted to decode the N coding blocks containing 64B to obtain data blocks containing data only and different types of control blocks containing control characters.

The first control block group discrimination subunit is adapted to place the control blocks containing the control characters into a control block buffer as a control block group, set an identifier Syn to identify the control block group, set an identifier LC to identify a last control block in the control block group, and place the data blocks containing data only, as a data block group, into a buffer containing data blocks only.

The first type discrimination subunit is adapted to use four bits to set an identifier BT to identify a block type of each control block, in which the type is corresponding to a type of each control block in the coding blocks containing 64B.

The first position discrimination subunit is adapted to use a space smaller than or equal to three bits to set an identifier BP to identify the position of the control blocks in the coding blocks containing 64B.

The first transmission unit is adapted to send the (64*N+1)B coding block obtained by conversion.

The sending device may further include a compression subunit, adapted to compress space occupied by the control characters in the control blocks.

Here, $2 \leq N \leq 8$, and N is an integer.

Corresponding to the first embodiment, the present invention further provides another sending device, which includes a first acquisition unit, a first conversion unit, and a first transmission unit. The first conversion unit includes a first decoding subunit, a first control block group discrimination subunit, a second type discrimination subunit, and a second position discrimination subunit.

The first acquisition unit is adapted to acquire N coding blocks containing 64B, in which N is an integer greater than or equal to 2.

The first conversion unit is adapted to convert the acquired N coding blocks into a (64*N+1)B coding block. The specific implementation is as follows.

The first decoding subunit is adapted to decode the N coding blocks containing 64B to obtain data blocks containing data only and different types of control blocks containing control characters.

The first control block group discrimination subunit is adapted to place the control blocks containing the control characters into a control block buffer as a control block group, set an identifier Syn to identify the control block group, set an identifier LC to identify a last control block in the control block group, and place the data blocks containing data only, as a data block group, into a buffer containing data blocks only.

The second type discrimination subunit is adapted to use two bits to set an identifier BT to identify the following block types corresponding to the control blocks in the control block group: a type of control blocks containing O code and/or C code, a type of control blocks containing removed /S/ code, and a type of control blocks containing removed /T/code; compress a space occupied by O code and/or C code in the control blocks containing the O code and/or the C code, use bits corresponding to the compressed space to set an identifier BTX to identify block types corresponding to the compressed control blocks, and combine the BTX with the BT to uniquely identify block types of the control blocks in the coding blocks containing 64B.

The second position discrimination subunit is adapted to use a space smaller than or equal to five bits to set an identifier BP to identify the positions of the control blocks in the coding blocks containing 64B.

The first transmission unit is adapted to send the (64*N+1)B coding block obtained by conversion.

Here, $2 \leq N \leq 32$, and N is an integer.

Corresponding to the second embodiment, the present invention further provides a receiving and processing device, which includes a second acquisition unit, a second conversion unit, and a second transmission unit. The second conversion unit includes a second decoding subunit, a first control block group determination subunit, a first control block type determination subunit, and a first position recovery subunit.

The second acquisition unit is adapted to acquire a (64*N+1)B coding block, in which N is an integer greater than or equal to 2.

The second conversion unit is adapted to decode the (64*N+1)B coding block to recover N coding blocks containing 64B. The specific implementation is as follows.

The second decoding subunit is adapted to decode the (64*N+1)B coding block to obtain an identifier Syn for identifying a control block group containing control characters, an identifier LC for identifying a last control block in the control block group, an identifier BP for identifying the positions of the control blocks in the coding blocks containing 64B, and an identifier BT for identifying the type of each control block.

The first control block group determination subunit is adapted to determine the control block group containing the control characters and a data block group containing data only according to the identifier Syn and the identifier LC.

The first control block type determination subunit is adapted to determine a type of each control block in the coding blocks containing 64B according to a corresponding relation between the types of the control blocks identified by the identifier BT and types of control blocks in the coding blocks containing 64B.

The first position recovery subunit is adapted to recover the control blocks to the positions in the coding blocks containing 64B according to the positions of the control blocks in the coding blocks containing 64B corresponding to the identifier BP.

The second transmission unit is adapted to send the recovered N coding blocks containing 64B.

The receiving and processing device may further include a space recovery subunit, which is adapted to recover space occupied by the control characters in the control blocks in the coding blocks containing 64B from space occupied by control characters in compressed control blocks.

Here, $2 \leq N \leq 8$, and N is an integer.

Corresponding to the second embodiment, the present invention further provides another receiving and processing device, which includes a second acquisition unit, a second conversion unit, and a second transmission unit. The second conversion unit includes a second decoding subunit, a first control block group determination subunit, a second control block type determination subunit, and a second position recovery subunit.

The second acquisition unit is adapted to acquire a (64*N+1)B coding block, in which N is an integer greater than or equal to 2.

The second conversion unit is adapted to decode the (64*N+1)B coding block to recover N coding blocks containing 64B. The specific implementation is as follows.

The second decoding subunit is adapted to decode the (64*N+1)B coding block to obtain an identifier Syn for identifying a control block group containing control characters, an identifier LC for identifying a last control block in the control block group, an identifier BP for identifying the positions of the control blocks in the coding blocks containing 64B, and an identifier BT for identifying a block type of each control block.

The first control block group determination subunit is adapted to determine the control block group containing the control characters and a data block group containing data only according to the identifier Syn and the identifier LC.

The second control block type determination subunit is adapted to determine types of control blocks in the control block group in the coding blocks containing 64B according to an identifier BTX for identifying types corresponding to compressed control blocks and the identifier BT for identifying the block types of the control blocks.

The second position recovery subunit is adapted to recover the control blocks to the positions in the coding blocks containing 64B according to the positions of the control blocks in the coding blocks containing 64B corresponding to the identifier BP.

The second transmission unit is adapted to send the recovered N coding blocks containing 64B.

Here, $2 \leq N \leq 32$, and N is an integer.

It can be seen from the technical solutions of the present invention that, the acquired N coding blocks are converted into a (64*N+1)B coding block, so that the required linear rate is reduced after conversion, thereby reducing the requirements for the payload bandwidth of the bearer layer, and satisfying the payload bandwidth required for transmitting 40 GE or 10 GE MAC frames in the OTN.

It will be apparent to persons skilled in the art that various modifications and variations can be made to the present invention without departing from the scope or spirit of the invention. In view of the foregoing, it is intended that the present invention cover modifications and variations of this invention provided that they fall within the scope of the following claims and their equivalents.

What is claimed is:

1. A sending method for adapting a payload bandwidth for data transmission, comprising:

acquiring N 66B coding blocks each of which contains 64B, wherein the N 66B coding blocks are obtained through a 64B/66B encoding scheme, N is an integer and $5 \leq N \leq 8$;

encoding the acquired N 66B coding blocks into a (64*N+1)B coding block; and sending the (64*N+1)B coding block obtained by encoding;

wherein encoding the acquired N 66B coding blocks into the (64*N+1)B coding block comprises:

decoding the N 66B coding blocks to obtain data blocks containing data only and different types of control blocks each of which contains at least one control characters;

placing the control blocks into a control block buffer as a control block group, setting a first identifier to identify the control block group, setting a second identifier to identify a last control block in the control block group, and placing the data blocks, as a data block group, into a data block buffer;

setting a third identifier by using four bits of each control block to identify a block type of each of the control blocks; and setting a fourth identifier by using a space smaller than or equal to three bits of each control block to identify positions of each of the control blocks in the N 66B coding blocks.

2. The method according to claim 1, wherein the encoding the acquired N 66B coding blocks into the (64*N+1)B coding block further comprises:

compressing a space occupied by the control characters in the control blocks.

3. A sending method for adapting a payload bandwidth for data transmission, comprising:

acquiring N coding blocks each of which contains 64B, wherein the N coding blocks are obtained through a 64B/66B encoding scheme or a 64B/65B encoding scheme, N is an integer greater than or equal to 2;

encoding the acquired N coding blocks into a (64*N+1)B coding block; and sending the (64*N+1)B coding block obtained by encoding;

wherein the encoding the acquired N coding blocks into the (64*N+1)B coding block comprises:

decoding the N coding blocks to obtain data blocks containing data only and different types of control blocks each of which contains at least one control characters, wherein the at least one control characters includes at least one of C code and O code;

placing the control blocks into a control block buffer as a control block group, setting a first identifier to identify the control block group, setting a second identifier to identify a last control block in the control block group, and placing the data blocks, as a data block group, into a data block buffer;

setting a third identifier by using two bits to identify block types corresponding to the control blocks in the control block group, compressing a space occupied by at least one of the O code and the C code in the control blocks, setting a fourth identifier by using bits corresponding to the compressed space to identify the block types corresponding to the compressed control blocks, and combining the fourth identifier with the third identifier to uniquely identify block types of the control blocks in the N coding blocks; and setting a fifth identifier by using a space smaller than or equal to five bits to identify positions of the control blocks in the N coding blocks.

4. The method according to claim 3, wherein $28 \leq N \leq 32$.

5. The method according to claim 3, wherein the first identifier occupies one bit.

6. A sending device, comprising:

an acquisition unit configured to acquire N 66B coding blocks each of which contains 64B, wherein the N 66B coding blocks are obtained through a 64B/66B encoding scheme, N is an integer and $5 \leq N \leq 8$;

a conversion unit configured to encode the acquired N 66B coding blocks into a (64*N+1)B coding block; and a transmission unit configured to send the (64*N+1)B coding block obtained by encoding;

wherein the conversion unit comprises:

a decoding subunit configured to decode the N 66B coding blocks to obtain data blocks containing data only and different types of control blocks each of which contains at least one control characters;

a control block group discrimination subunit configured to place the control blocks into a control block buffer as a control block group, set a first identifier to identify the control block group, set a second identifier to identify a last control block in the control block group, and place the data blocks, as a data block group, into a data block buffer;

a type discrimination subunit configured to set a third identifier by using four bits to identify a block type of each of the control blocks; and a position discrimination subunit configured to set a fourth identifier by using a space smaller than or equal to three bits to identify positions of the control blocks in the N 66B coding blocks.

7. The sending device according to claim 6, wherein the first conversion unit further comprises:

a compression subunit configured to compress a space occupied by the control characters in the control blocks.

8. A sending device, comprising:

an acquisition unit configured to acquire N coding blocks each of which contains 64B, wherein the N coding blocks are obtained through a 64B/66B encoding scheme or a 64B/65B encoding scheme, N is an integer greater than or equal to 2;

a conversion unit configured to encode the acquired N coding blocks into a (64*N+1)B coding block; and a transmission unit configured to send the (64*N+1)B coding block obtained by encoding;

wherein the first conversion unit comprises:

a decoding subunit configured to decode the N coding blocks to obtain data blocks containing data only and different types of control blocks each of which contains at least one control characters, wherein the at least one control characters includes at least one of C code and O code;

a control block group discrimination subunit configured to place the control blocks into a control block buffer as a control block group, set a first identifier to identify the control block group, set a second identifier to identify a last control block in the control block group, and place the data blocks, as a data block group, into a data block buffer;
a type discrimination subunit configured to set a third identifier by using two bits to identify block types corresponding to the control blocks in the control block group, compress a space occupied by at least of the O code and the C code in the control blocks, set a fourth identifier by using bits corresponding to the compressed space to identify block types corresponding to the compressed control blocks, and combine the fourth identifier with the third identifier to uniquely identify the block types of the control blocks in the N coding blocks; and
a position discrimination subunit configured to set a fifth identifier by using a space smaller than or equal to five bits to identify the positions of the control blocks in the N coding blocks.

9. The sending device according to claim 8, wherein $28 \leq N \leq 32$.

10. A receiving and processing method for adapting a payload bandwidth for data transmission, comprising:
acquiring a (64*N+1)B coding block, wherein N is an integer and $5 \leq N \leq 8$;
decoding the (64*N+1)B coding block to recover N 66B coding blocks each of which contains 64B, wherein the N 66B coding blocks were obtained through a 64B/66B encoding scheme; and
sending the recovered N 66B coding blocks;
wherein the decoding the (64*N+1)B coding block to recover the N 66B coding blocks comprises:
decoding the (64*N+1)B coding block to obtain a first identifier for identifying a control block group, a second identifier for identifying a last control block in the control block group, a third identifier for identifying the positions of the control blocks in the N 66B coding blocks, and a fourth identifier for identifying a block type of each of the control blocks;
determining the control block group and a data block group containing data blocks only according to the first identifier and the second identifier;
determining a type of each of the control blocks in the N 66B coding blocks according to a corresponding relation between the types of the control blocks identified by the fourth identifier and the types of the control blocks in the N 66B coding blocks; and
recovering the control blocks to their positions in the N 66B coding blocks corresponding to the third identifier of each of the control blocks.

11. The method according to claim 10, wherein the decoding the (64*N+1)B coding block to recover the N 66B coding blocks further comprises:
recovering a space occupied by the control characters in the control blocks in the N 66B coding blocks from a space occupied by control characters in compressed control blocks.

12. A receiving and processing method for adapting a payload bandwidth for data transmission, comprising:
acquiring a (64*N+1)B coding block, wherein N is an integer greater than or equal to 2;
decoding the (64*N+1)B coding block to recover N coding blocks each of which contains 64B, wherein the N coding blocks were obtained through a 64B/66B encoding scheme or a 64B/65B encoding scheme; and
sending the recovered N coding blocks;

wherein the decoding the (64*N+1)B coding block to recover the N coding blocks comprises:
decoding the (64*N+1)B coding block to obtain a first identifier for identifying a control block group, a second identifier for identifying a last control block in the control block group, a fifth identifier for identifying positions of the control blocks in the N coding blocks, and a third identifier for identifying a block type of each of the control blocks;
determining the control block group and a data block group containing data blocks only according to the first identifier and the second identifier ;
determining block types of the control blocks in the control block group in the N coding blocks according to a fourth identifier for identifying block types of compressed control blocks and the third identifier for identifying the block types of the control blocks; and
recovering the control blocks to positions of the control blocks in the N coding blocks corresponding to the fifth identifier of each of the control blocks.

13. The method according to claim 12, wherein $28 \leq N \leq 32$.

14. A receiving and processing device, comprising:
an acquisition unit configured to acquire a (64*N+1)B coding block, wherein N is an integer and $5 \leq N \leq 8$;
a conversion unit configured to decode the (64*N+1)B coding block to recover N 66B coding blocks each of which contains 64B, wherein the N 66B coding blocks were obtained through a 64B/66B encoding scheme; and
a transmission unit configured to send the recovered N 66B coding blocks;
wherein the conversion unit comprises:
a decoding subunit configured to decode the (64*N+1)B coding block to obtain a first identifier for identifying a control block group, a second identifier for identifying a last control block in the control block group, a third identifier for identifying the positions of the control blocks in the N 66B coding blocks, and a fourth identifier for identifying a block type of each of the control blocks;
a control block group determination subunit configured to determine the control block group and a data block group containing data blocks only according to the first identifier and the second identifier;
a control block type determination subunit configured to determine a type of each of the control blocks in the N 66B coding blocks according to a corresponding relation between the types of the control blocks identified by the fourth identifier and the types of the control blocks in the N 66B coding blocks; and
a position recovery subunit configured to recover the control blocks to their positions in the N 66B coding blocks corresponding to the third identifier of each of the control blocks.

15. The receiving and processing device according to claim 14, wherein the conversion unit further comprises:
a space recovery subunit configured to recover a space occupied by the control characters in the control blocks in the N 66B coding blocks from a space occupied by control characters in compressed control blocks.

16. A receiving and processing device, comprising:
an acquisition unit configured to acquire a (64*N+1)B coding block, wherein N is an integer greater than or equal to 2;
a conversion unit configured to decode the (64*N+1)B coding block to recover N coding blocks each of which contains 64B, wherein the N coding blocks were obtained through a 64B/66B encoding scheme or a 64B/65B encoding scheme; and a transmission unit configured to send the recovered N coding blocks;

wherein the second conversion unit comprises:

a decoding subunit configured to decode the (64*N+1)B coding block to obtain a first identifier for identifying a control block group, a second identifier for identifying a last control block in the control block group, a fifth identifier for identifying positions of the control blocks in the N coding blocks, and a third identifier for identifying a block type of each of the control blocks;

a control block group determination subunit configured to determine the control block group and a data block group containing data blocks only according to the first identifier and the second identifier;

a control block type determination subunit configured to determine block types of the control blocks in the control block group in the N coding blocks according to a fourth identifier for identifying block types of compressed control blocks and the third identifier for identifying the block types of the control blocks; and a position recovery subunit configured to recover the control blocks to positions of the control blocks in the N coding blocks corresponding to the fifth identifier of each of the control blocks.

17. The device according to claim 16, wherein $28 \leqq N \leqq 32$.

* * * * *